3,320,176
METHOD OF PRODUCING CERAMIC NUCLEAR
FUEL MATERIAL HAVING INCORPORATED
THEREIN BURNABLE POISON
Fred W. Davis, Lynchburg, Va., assignor to The Babcock
& Wilcox Company, New York, N.Y., a corporation of
New Jersey
No Drawing. Filed Apr. 1, 1966, Ser. No. 539,267
7 Claims. (Cl. 252—301.1)

This invention relates generally to the production of ceramic nuclear fuel materials, and more particularly to a method of uniformly dispersing within the fuel material, a predetermined amount of a burnable poison.

It is often desirable to dispose a quantity of a non-fissionable, nonfertile substance having a high neutron absorption cross-section in the active area of the core of a nuclear reactor to control the excess reactivity necessary to have the reactor operate for an economically practical length of time between fuel loadings. Such high neutron absorption cross-section substances are commonly referred to as neutron poisons, and certain of the known poisons are characterized as burnable poisons due to their inherent characteristic of losing effectiveness during which they are exposed to a reactor neutron flux.

Typically, reactors will have some form of neutron poison in a movable control rod to allow insertion or withdrawal of the poison to effect control of operation or shutting down of the reactor. A burnable poison may also be initially distributed throughout the volume of a reactor core to allow for an increase in the initial excess loading of fissionable material into the reactor in order to attain a longer core lifetime with substantially the same initial effective reactivity. It is with this latter general use of burnable poisons that this specification is primarily concerned.

When the burnable poison is distributed throughout the reactor core to effect an increase in core lifetime, its purpose is to hold down reactivity caused by excess fuel mass which, without the presence of the burnable poison, would result in excess reactivity during the initial portion of the reactor lifetime. As the burnable poison absorbs neutrons, it loses its effectiveness, this process being generally termed as a "burning out" of the poison. Since burnable poisons ideally lose their effectiveness at a rate approximately equal to the rate at which the fissionable material is consumed, the excess reactivity of the reactor at the beginning of the core life can be controlled by the proper selection of the burnable poison material and its quantitative concentration within the core. Thus by disposing an appropriate quantity of a suitable burnable poison in the core of a reactor, the net reactivity of the reactor can be controlled so as to have a relatively flat reactivity characteristic over the early portions of its useful lifetime.

The desirability of uniformly dispersing a burnable poison throughout the volume of a reactor core is apparent since such uniform dispersion will afford uniform effectiveness of the poison in all areas of the core and will substantially minimize the design problems and cost of core fabrication.

Heretofore, there has been no known way of suitably adding a burnable poison to ceramic oxide nuclear fuel material in predictable quantities so as to afford the necessary homogeneity of the burnable poison in the reactor core. Accordingly, in present nuclear reactor installations the poison has been interspersed throughout the reactor core in separate poison containing elements, or alternatively has been placed in the cladding of the fuel elements rather than in the fuel itself.

Boron is considered to be a particularly suitable poison because of its neutron capture cross-section, and its dispersion within the cladding of nuclear fuel elements is known in the art—see for example U.S. Patent 3,103,476, issued Sept. 10, 1963. However, prior attempts to incorporate boron with the fuel material itself have been unsuccessful. More specifically, the problem has been that boron in any form is readily converted to the oxide $(B_2O_3)$, which in turn hydrates upon contact with water to form boric acid, a volatile substance at elevated temperature. Thus, in the case of oxide fuels, during the calcining step of fuel preparation, the volatile boric acid is driven off as a vapor in various uncontrollable amounts so that the residual amount cannot be predicted with certainty.

Although the incorporation of boron as a poison material in the cladding of nuclear fuel elements has been successful, there are several reasons why it is preferred that the boron be incorporated directly in the fuel material. One of the reaction products of neutron absorption by boron is a gaseous helium atom which, if allowed to collect in a metal lattice (such as steel cladding material), can cause severe swelling, distortion, and potentially even failure of the cladding material. When the boron poison is dispersed within the fuel material itself, the same gaseous product is released; however, since a substantial amount (roughly 30%) of all fission events give rise to gaseous products, and since accommodations have already been made for the release of such gaseous products, the added gaseous products from the poison cause no additional problems. Additionally, when the boron is incorporated directly in the fuel material, the cladding material need not be specially prepared with the boron addition, and the absence of the requirements of maintaining a predetermined quantity of boron in the cladding material allows significantly greater latitude in regard to the metal working operations (welding, heat treating, etc.) which normally must be performed on the cladding material.

Recently a ceramic fuel production process known as the "sol-gel process" has gained considerable notoriety. In this process, a colloid or sol of a suitable fertile material (e.g. thoria) is first prepared. Fissionable material (in the form, for example, of uranyl nitrate) is added to and intimately interspersed with the colloidal fertile material. The colloid is then dried to form gel particles which are subsequently calcined at temperatures slightly above 1100° C. to form an extremely dense (99+%) of theoretical density) mixed oxide ceramic fuel material. Various modifications to the "sol-gel process" have been proposed, one of which embodies preparing separate sols of the fertile material and the fissionable material-bearing substance and then mixing these sols thoroughly to effect the necessary sorption of the fissionable material in the fertile material. It should be understood that the herein disclosed invention is applicable to the "sol-gel process" as originally conceived, as well as to all subsequently developed variations thereon.

In the product material of the "sol-gel process" it has been observed that the oxides of the fertile and fissionable material form an almost homogeneous solid solution. Nevertheless, the precise mechanism whereby the fissionable material is taken up by the fertile material in colloidal form is not known (it could, for example, be adsorption or an ion exchange phenomena); moreover, it is likely that this observed uptake mechanism will also be effective when the fertile material is in the gel form, and possibly even when the fissionable material impregnated gel particles have been partially calcined to a point where dehydration has been substantially completed.

It is accordingly an object of this invention to so amplify and modify the "sol-gel process" and known improvements thereon as to provide a method whereby predictable quantities of a burnable poison (particularly boron) may be homogeneously incorporated within a mixed oxide ceramic fuel material.

According to the present invention, this object is attained in a method for producing mixed oxide ceramic nuclear fuel material, which includes the steps of forming a colloid of a fertile material, drying the colloid to form distinct gel particles, and calcining the gel particles to effect densification thereof. A predetermined quantity of fissionable material is added to the fertile material at some stage of the process after the colloid of the fertile material has been prepared and before the calcination begins. A predetermined quantity of burnable neutron poison is also added to the fertile material at some stage of the process after the colloid of the fertile material has been prepared and before densification of the gel particles has been completed.

The invention is applicable to all of the known mixed oxide ceramic nuclear fuel materials. Moreover, the invention encompasses the use of any known burnable neutron poison substance, but is particularly intended for use with boron (B–10) and those substances having a high neutron absorption cross section characteristic. Preferably, the poison is added to the sol or to the gel form of the fertile material, which additions may suitably be respectively made by mixing the poison with the sol or by contacting the gel particles with a liquid phase of the poison substance.

For a better understanding of the invention, its scope, its operating advantages, and specific objects attained by its use, reference should be had to the following description.

As previously mentioned, in the "sol-gel process," fissionable material in the form of a uranyl nitrate solution is mixed into the colloid of the fertile material (thoria), and upon subsequent calcination, an extremely dense and homogeneous mixture of the oxides is produced. To further investigate the uptake machanism involved, in recent experiments a uranyl nitrate solution and a boric acid solution were added to separate batches of thoria sol and the change in acidity of the resultant sols was observed. As expected, the sol to which the uranyl nitrate had been added experienced an increase in pH; however, surprisingly, the sol to which the boric acid had been added experienced a sharp decrease in pH. This difference in the acidity of the resultant sols is evidence that a different uptake reaction, and possibly a different uptake mechanism, obtains in the two sol systems. Moreover, the unexpectedly sharp decrease in pH experienced with the addition of boric acid is evidence that borate ions and not boric acid molecules are the entity being taken up by the sol. Thus, since the boron is taken into the sol in a form other than the highly volatile form of boric acid, it is logical to conclude that the boron will not be driven off during subsequent drying of the sol or by calcination at elevated temperatures. The form in which the boron is tied up with the fertile material also leads to the conclusion that the boron in the product ceramic fuel material will not be displaced within the fuel elements upon exposure to the high temperatures normally incident with reactor fuel element operation.

It is probable that the mechanism whereby boron is taken up by fertile material in sol form will also be operative when the fertile material is in gel form, and even possibly when the gel has been fired to a point (approximately 800° C.) prior to complete densification of the particles. Impregnation at these later stages of the process offers the particular advantage of being able to preselect the gel particle sizes to which the boron is to be added. Moreover, by adding the boron to the fuel material in the later stages of the process where the material contains significantly decreased quantities of water, the possibilities of hydration of the boron are substantially reduced.

In view of the above, it is most likely that addition of the poison substance to the sol form of the fertile material will be acceptable. The actual addition of the poison to the sol may be accomplished by adding the boron-containing material directly to the thoria sol. It may, however, be advantageous to first prepare a separate sol containing the boron, and later mix the two sols to effect the desired intermingling of the thoria and poison-bearing material. It may even be desirable that the fissionable material be prepared as a separate sol, and that all three sols be commingled to effect the operative uptake mechanism(s). Addition of the poison to the fertile material sol with the fissionable material has certain advantages in that the uptake of both poison and fissionable material in the sol will take place substantially simultaneously. If the uptake steps were to be conducted sequentially, it may be that the subsequently added material would partially replace the previously added material by an ion exchange phenomenon and thus eliminate the prospects of predictably controlling the content of both the poison and fissionable material in the product fuel. When both are added to the fertile material sol in predetermined amounts, it is virtually certain that both will be present in the gel form of the material.

This disclosure has been in terms of, and experimental work has been primarily limited to thoria/urania mixed oxide fuel material. However, it is contemplated that the herein disclosed invention is equally adaptable for use in conjunction with the production of other mixed oxide fuel materials, in particular urania/urania and plutonia/urania. When urania is used as the fertile material, it is understood that the isotope of intrisinic importance is U–238, and when urania is used as the fissionable material, it is understood that the isotope of intrinsic importance may be either U–233 or U–235.

Boron (B–10) is the poison substance now recognized as being most idealy suited for use in mixed oxide fuels. The actual boron containing material used may be in the form, e.g., metal, oxide, carbide, acid, salt, or organic compounds. Moreover, it is contemplated that the herein disclosed invention is adaptable for accommodation with other poison materials. In particular, it is contemplated that several of the lanthanides and some transition metals (particularly hafnium) might prove to be suitable for addition to fuel materials via the herein disclosed methods. In fact, some other poison substance not having the hydration characteristics of boron, may eventually prove to be the more appropriate substance for addition acording to the herein disclosed methods.

To date, work on the sol-gel and related processes has been carried out using aqueous solutions. For example, regarding the production of thoria/urania fuel material, the thoria sol is normally prepared by mixing thoria powder and dilute nitric acid, and uranium is added in the form of an aqueous uranyl nitrate solution. Nevertheless, it may be possible to use a base solvent other than water. In fact, a solvent other than water may be desirable in view of the previously experienced problems with hydration of boron.

This disclosure has been in terms of the production of ceramic mixed oxide nuclear fuel materials, and it is in this area that this invention is anticipated as being particularly advantageous. In a broader sense, however, the present invention encompasses a method of producing refractory material of any kind by contacting prepared distinct gel particles of an inorganic material with an ionic substance in liquid phase to directly impregnate the gel particles with the ionic substances. Subsequently the thus impregnated particles are calcined to effect densification thereof. In this sense, the invention recognizes the presence of an effective uptake mechanism of the particulate gel form of the inorganic material.

What is claimed is:

1. A method of producing ceramic nuclear fuel material comprising the steps of preparing a colloid of a nuclear fertile material, drying said colloid to form gel particles, calcining said gel particles at a temperature sufficient to substantially completely densify said particles, adding fissionable material to said fertile material after the colloid has been prepared, and adding a burnable neutron poison to said fertile material after the colloid has been prepared and prior to the complete densification of said particles.

2. The method according to claim 1 wherein the nuclear fertile material is selected from the group consisting of thoria and urania, and the fissionable material is selected from the group consisting of a solution of uranium and a solution of plutonium.

3. The method according to claim 2 wherein a predetermined quantity of said poison is added to and intimately mixed with the colloid of the nuclear fertile material.

4. The method according to claim 3 wherein a predetermined quantity of fissionable material is added to and intimately mixed with the colloid of the nuclear fertile material.

5. The method according to claim 4 wherein the poison and the fissionable material are prepared in colloidal form prior to being added to the colloid of the nuclear fertile material.

6. The method according to claim 3 wherein the addition of fissionable material is accomplished with the fissionable material in aqueous solution, the colloid of the nuclear fertile material is prepared as an aqueous colloid, and the burnable neutron poison is boron.

7. The method according to claim 2 wherein the burnable neutron poison is boron.

No references cited.

CARL D. QUARFORTH, *Primary Examiner.*

BENJAMIN R. PADGETT, *Examiner.*

S. J. LECHERT, Jr., *Assistant Examiner.*